United States Patent [19]
Santicchi

[11] Patent Number: 5,072,827
[45] Date of Patent: Dec. 17, 1991

[54] SEGMENTED BELT FOR USE ON BOX-TYPE SINGLE-RAIL OVERHEAD CONVEYORS

[76] Inventor: Angusto Santicchi, Strada San Andrea delle Fratte., 06100-Perugia Fraz. San Sisto, Italy

[21] Appl. No.: 644,524

[22] Filed: Jan. 23, 1991

[30] Foreign Application Priority Data

Mar. 14, 1990 [IT] Italy .................................. 611 A/90

[51] Int. Cl.$^5$ ............................................ B65G 17/32
[52] U.S. Cl. .................................. 198/678.1; 198/845
[58] Field of Search ............... 198/845, 838, 681, 831, 198/678.1

[56] References Cited

U.S. PATENT DOCUMENTS

| | | | |
|---|---|---|---|
| 3,269,525 | 8/1966 | Paulski | 198/845 |
| 4,793,473 | 12/1988 | Gilgore et al. | 198/838 |

FOREIGN PATENT DOCUMENTS

| | | | |
|---|---|---|---|
| 537153 | 3/1959 | Belgium | 198/681 |
| 2332498 | 1/1975 | Fed. Rep. of Germany | 198/845 |
| 1171401 | 1/1959 | France | 198/678.1 |
| 572604 | 10/1945 | United Kingdom | 198/678.1 |
| 701373 | 12/1953 | United Kingdom | 198/681 |
| 814873 | 6/1959 | United Kingdom | 198/678.1 |
| 1011930 | 12/1965 | United Kingdom | 198/845 |

Primary Examiner—Joseph E. Valenza
Assistant Examiner—Cheryl L. Gastineau
Attorney, Agent, or Firm—Leonard Bloom

[57] ABSTRACT

This invention relates to a segmented belt for use on box-type signle-rail overhead conveyors characterized by a special modular structure which permits bending about the vertical and the horizontal axis. The belt consists of many identical trolleys placed on alternating orthogonal planes. Each of these trolleys consists of a thin and flexible rectangular metal plate having an idle wheel mounted on either side.

2 Claims, 1 Drawing Sheet

SEGMENTED BELT FOR USE ON BOX-TYPE SINGLE-RAIL OVERHEAD CONVEYORS

This patent application for an industrial design patent concerns a flexible segmented belt for use as a pulling, guiding and transport element in automatic overhead conveyor systems.

The belt according to the invention can be used on closed circuit single-rail overhead conveyor systems utilized for moving objects during selection, distribution and storing operations.

The applicant Company has already patented a box-type single-rail conveyor system with rectangular cross-section and a middle notch on the bottom horizontal side; a thin metal continuous belt is used as the transport element; this slides on the above single-rail and is positioned edge-wise with slots that are used to fix hooks or similar supports.

A series of wheels are fitted along the upper edge of this belt; these allow the belt to slide and centre the same with respect to the box-type rail in which the above wheels are housed.

This belt follows the curved route of the support rail and guide when this is constructed on a horizontal plane; this is possible thanks to the flexibility of the belt which allows the same to deviate sideways from the guide route. This belt, however, can not bend upwards or downwards on its own vertical plane so that it is currently not possible to produce single rails with continuous and coplanar sections at different angles.

In order to change the level of the route for overhead conveyors, the applicant Company has to date used sections at different angles on two different parallel vertical or incident planes which are joined with wide curves so that the conveyor belt can change angle gradually as it runs along these bends, at which the belt itself is subject to a bending-torsion action.

The necessity of using these wide connection curves does however mean that the overhead conveyor systems do not adapt successfully to the construction of circuits which must be produced inside areas with a limited surface area and capacity.

The belt according to the invention is characterized in that it can bend both around the vertical and horizontal axes; this mean that in addition to curving normally towards the left or to the right easily it can also bend upward or downward.

This was achieved by designing a segmented conveyor belt with a modular support and sliding chain coonsisting of many trolleys each made of a thin rectangular metal plate on whose shortest opposing sides two indentical metal "L" shaped brackets are applied; at the centre of each bracket there is a through pin which acts as the support of two idle running wheels whose diameter is slightly larger than the height of the plate.

The various trolleys forming the above chain rest and slide alternatively on orthogonal planes since the connection between the different modules is achieved by crossing the respective end brackets firmly together.

This solution ensures that the position of the pair of trolley wheels is orthogonal with respect to the position of the wheels of the previous trolley and those of the next trolley.

A laminate element is fitted on those trolleys whose plate is placed vertically; this laminate element has one or more through slots which are used as anchoring points for the hooks which support the objects transported.

The series of all the laminate elements suspended to the above chain make up the transport structure of the segmented belt according to the invention.

The particular characteristic of this new conveyor belt is that both its components—that is the transport and guide chain and the segmented laminate transport stucture—can be deviated from their rectilinear route in any other direction.

In fact, the laminate elements of the transporting structures can bend sideways in the case of a right hand or left hand curve since they are placed edgewise; the overlying chain follows these deviations sideways thanks to the progressive bending of all the plates of the trolleys whose idle running wheels are fitted along the horizontal axis.

In the case of an ascending or descending section of rail, the laminate elements of the conveyor structure are slanted progressively forwards or backwards respectively, independently from the other identical laminate elements which follow and precede it; the overhead chain follows these slanting variations since all the plates of the trolleys with idle running wheels along the vertical axis, bend progressively.

For major clarity the description according to the invention continues with reference to the enclosed drawings which are intended for illustrative purposes and not in a limiting sense, in which.

Figure 2:
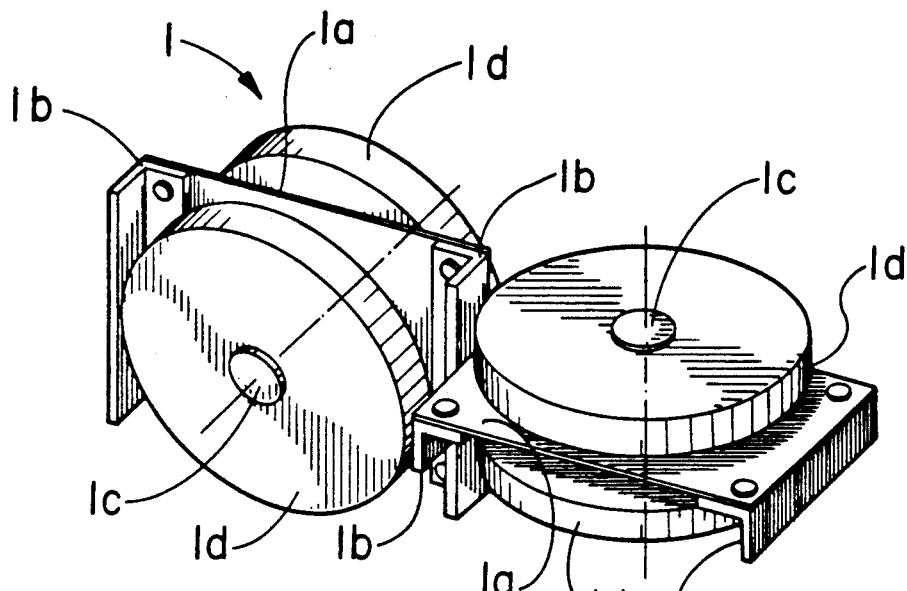
FIG. 2 is an axonometric illustration of two consecutive modules of the transport chain of the belt according to the invention.
Figure 1:
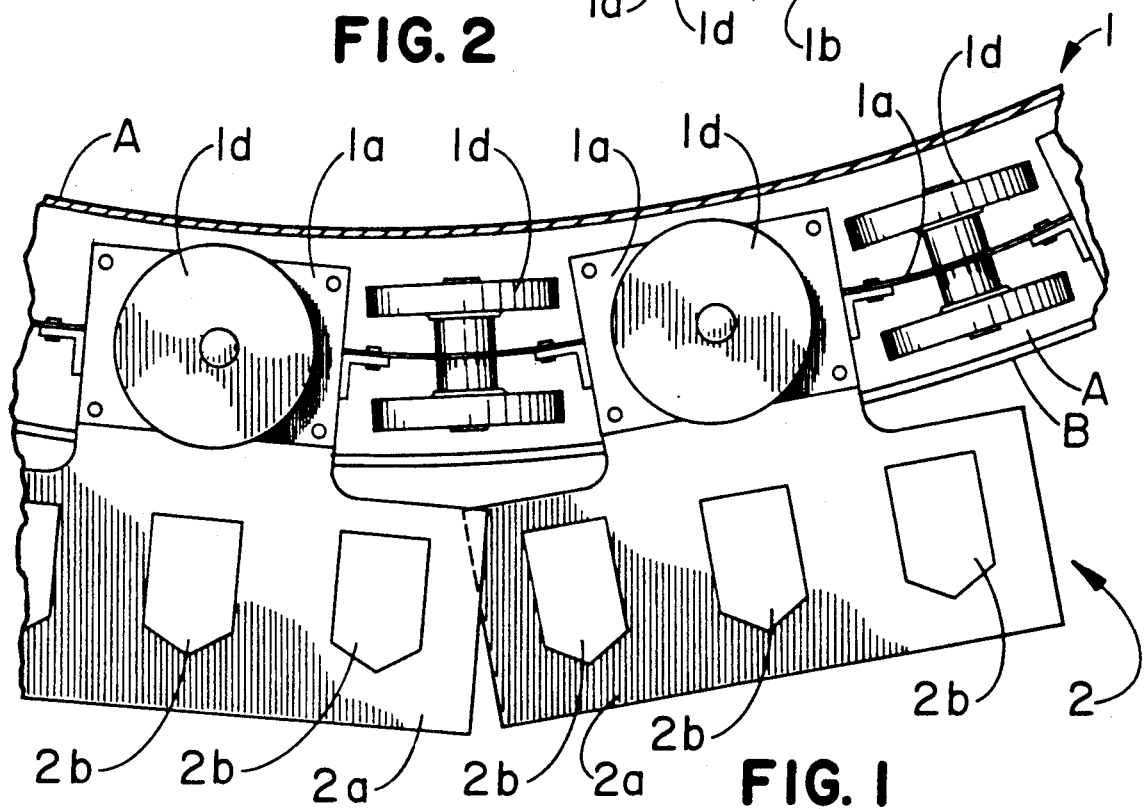
FIG. 1 is a side view of a descending-ascending curved section of the single box-type rail, without the front wall to illustrate the internal section with four consecutive trolleys of the transport chain of the belt according to the invention.

With reference to the enclosed figures the belt in question consists of a transport chain (1)—which slides inside the box-type single rail (A) thanks to a series of vertical and horizontal centering wheels—and by a segmented laminate structure (2) with slots into which the hooks of the support elements for the object to be transported, are fitted.

The transport chain (1) consists of many identical trolleys which are fitted together and which consist of a rectangular metal plate (1a) on whose transverse opposing sides the same number of "L" shaped brackets (1b) are fitted; at the centre of each of these plates (1a) there is a through pin (1c) which acts as the support for a pair of opposing idle running wheels (1d) whose diameter is greater than the height of the plate (1a).

The different consecutive chains which make up the conveyor are placed alternatively on orthogonal planes so that while the plate (1a) of a trolley is in horizontal position, the plates (1a) of the previous trolley and of the next trolley are on the same vertical plane.

This is achieved by crossing the transverse sections of the "L" shaped brackets (1b) of adjacent trolleys.

The laminate and segmented support structure (2) consists of many laminate elements (2a) which are aligned edgewise and placed close together.

In fact the chain (1) trolleys whose plate (1a) is vertical, are fitted with a laminated element (2a) at the bottom which project from under the single rail (A) through the longitudinal slot (B) which runs along the full length of the bottom of the single rail.

This laminate element which can be shaped as necessary, in this particular case, is shaped like a reverse "T" on whose horizontal section in this preferred embodiment of the invention there are three adjacent slots (2b) for fitting three support hooks for the objects to be transported.

These laminate elements (2a) are independent from each other, even if the stability of their positions is ensured by the continuity of the chain (1) which support the same. This is also particularly important in as much as the laminate transport structure is segmented in many short single elements thereby allowing the belt to be deviated on the same vertical plane.

Purely for information purposes, it should be noted that it is possible to use traditional means previously used on systems using continuous slotted belts for the traction of the entire belt according to the invention; an example could be pairs of friction wheels which adhere on opposite sides to the segmented laminate conveyor structure (2) or standard geared wheels with a vertical axis whose teeth engage into the top of these slots (2b) on the laminate parts;

In a different version, instead of the "L" shaped brackets, a special connection element moulded in a single piece and consisting of two crossed sections corresponding to the pair of the above "L" shaped brackets, could be used.

I claim:

1. A segmented conveyor belt for used on overhead single bo conveyor systems characterized by:
    a transport, support and guide modular chain (1)—which slides in the single box-type rail (A)—consisting of many identical trolleys placed on alternating orthogonal planes; each of these trolleys consisting of a thin and flexible rectangular metal plate (1a) at whose opposite transverse sides the number of "L" shaped brackets (1b) are fitted while at the centre of each of these plates (1a) there is a through pin (1c) which acts as the support of a pair of idle running opposing wheels (1d) whose diameter is greater than the height of the plate (1a);
    a segmented and laminate support structure (2) consisting of many laminate slotted elements (2a), aligned edgewise and placed close together, each hung from one of the trolleys of the chain (1) whose plates (1a) is in vertical postion.

2. A segmented and conveyor belt for use on overhead single box rails according to claim 1, which, in the preferred embodiment of the invention, consists of single reverse T-shaped laminate elements (2a) having three adjacent slots (2b) on the horizontal section in which the same number of support hooks may be fixed for holding the object to be transported.

* * * * *